United States Patent
Grieve

(10) Patent No.: US 8,440,358 B2
(45) Date of Patent: May 14, 2013

(54) METHOD OF OPERATING A FUEL CELL SYSTEM ON LOW QUALITY BY-PRODUCT GASES

(75) Inventor: Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/315,448

(22) Filed: Dec. 9, 2011

(65) Prior Publication Data

US 2012/0121995 A1    May 17, 2012

(51) Int. Cl.
*H01M 8/06* (2006.01)
(52) U.S. Cl.
USPC ............. 429/410; 429/409; 429/411
(58) Field of Classification Search ............ 429/410
See application file for complete search history.

(56) References Cited

U.S. PATENT DOCUMENTS

| | | | |
|---|---|---|---|
| 5,451,249 | A | 9/1995 | Spiegel et al. |
| 7,285,350 | B2 | 10/2007 | Keefer et al. |
| 2001/0049035 | A1 | 12/2001 | Haltiner, Jr. et al. |
| 2004/0131912 | A1 | 7/2004 | Keefer et al. |
| 2010/0129691 | A1 | 5/2010 | Dooher et al. |

OTHER PUBLICATIONS

International Search Report PCT/US12/68064.

*Primary Examiner* — Raymond Alejandro
*Assistant Examiner* — Gary Harris
(74) *Attorney, Agent, or Firm* — James M. Chan

(57) ABSTRACT

A method of operating a fuel cell system on a by-product gas containing a fuel constituent. The fuel cell system includes a fuel reformer for forming a reformate stream, a combustor for supplying heat energy to the fuel reformer, and a fuel cell stack. The method includes the steps of separating a by-product gas into a purified gas stream and a residual stream with a gaseous fuel purifier, feeding the purified gas stream to the fuel reformer configured to transform the purified gas stream to produce a reformate stream, and feeding the residual gas stream to a combustor configured to provide heat energy to the fuel reformer. The purified gas stream contains a higher concentration of preferable fuel constituents and a lower concentration of contaminants than the residual gas stream.

15 Claims, 4 Drawing Sheets

METHOD OF OPERATING A FUEL CELL SYSTEM ON LOW QUALITY BY-PRODUCT GASES

TECHNICAL FIELD OF INVENTION

The present disclosure relates to a method of operating a fuel cell system; more particularly, a method of operating a solid oxide fuel cell system; and still more particularly, a method of operating a solid oxide fuel cell system on low quality by-product gases.

BACKGROUND OF INVENTION

Fuel cells are used to produce electricity when supplied with fuels containing hydrogen and an oxidant such as air. There are several different types of fuel cells known in the art; amongst these are solid oxide fuel cells (SOFC). SOFC are regarded as highly efficient electrical power generator that produces high power density with fuel flexibility. A typical SOFC includes a dense electrolyte sandwiched between a cathode layer and an anode layer. Air is passed over the surface of the cathode layer and a fuel containing hydrogen ($H_2$) and carbon monoxide (CO) is passed over the surface of the anode layer opposite that of the cathode layer. Oxygen ions from the air migrate from the cathode layer through the dense electrolyte to the anode layer in which it reacts with the $H_2$ and CO in the fuel, forming water and $CO_2$, and thereby creating an electrical potential between the anode layer and the cathode layer of about 1 volt. To increase the voltage and power, multiple SOFC repeating units are stacked in electrical series forming a SOFC stack.

The CO and $H_2$ fuel is provided to the SOFC stack in a form of a reformate stream. It is known in the art to use a fuel reformer such as a catalytic partial oxidation (CPOx) hydrogen reformer to process a hydrocarbon fuel such as methane to produce CO and $H_2$. To improve stack power density and system efficiency, a portion of the effluent gas from the SOFC stack anode is recycled to the fuel reformer. The effluent gas is also known as the anode tail gas and includes a large amount of water vapor and $CO_2$. When these gases are recycled back to the fuel reformer, endothermic steam reforming occurs in the fuel reformer, thereby lowering the temperature of the fuel reformer. To maintain the temperature of the fuel reformer at an elevated optimal level, a combustor and heat exchanger may be incorporated into the fuel reformer. A portion of the anode tail gas is supplied to the combustor and is combusted with depleted air from the cathode tail gas. The hot effluent from the combustor is then passed through the heat exchanger to add heat to the reforming process. It is also known in the art that certain fuels can be partially or fully reformed inside the SOFC stack anode, when the SOFC stack is at operating temperature. For example, fuels such as methane, methanol, ammonia, and dimethyl ether can be mixed with reformate and/or gas anode tail gas and introduced directly into the SOFC stack anode.

U.S. Pat. No. 5,451,249 discloses that a gas stream that emanates from a landfill may be treated to contain essentially a hydrocarbon such as methane, which can be used as a fuel source in a fuel cell power plant. The method taught by U.S. patent '249 includes passing the landfill gas through a hydrogen sulfide adsorption bed to reduce hydrogen sulfides to a level of 5 ppm or less; cooling the resultant gas to condense the water vapors and heavier hydrocarbons; adsorbing the water vapor and heavier hydrocarbon fractions to form a dried gas stream; removing the hydrocarbon contaminants through an activated carbon; and removing contaminants particulates from the dried gas stream. The method also produces a waste gas stream containing hydrocarbons and other contaminants with minimal BTU value; therefore requiring an additional fuel source to flare the waste gas stream into the atmosphere to prevent polluting the environment.

This method of treating landfill gas in order to obtain the purity of methane required for a fuel cell is complex, costly, and involves substantial losses in efficiency. It limits the economic attractiveness of using landfill gas as a fuel source for fuel cells due to the high level of treatments to remove substantially all impurities, which includes sulfur compounds that may poison the reformer catalyst and fuel cell.

SUMMARY OF THE INVENTION

Briefly described, the present invention provides a method of operating a fuel cell system on a by-product gas containing one or more desired fuel constituents. The invention is applicable to all types of fuel cells, but particularly applies to high temperature fuel cells such as solid oxide fuel cells (SOFC) and molten carbonate fuel cells (MCFC). The embodiments described herein are relevant to SOFC application, but variations of the system are applicable for other fuel cell types. The fuel cell system includes a fuel reformer for forming a reformate stream, a combustor for supplying heat energy to the fuel reformer, and an SOFC stack. The method includes the steps of separating the by-product gas into a purified gas stream and a residual stream with a gaseous fuel purifier, feeding the purified gas stream to the fuel reformer configured to transform the purified gas stream to produce a reformate stream, and feeding the residual gas stream to a combustor configured to provide heat energy to the fuel reformer. The purified gas stream contains a higher concentration of preferable fuel constituents and a lower concentration of contaminants than the residual gas stream. The desired recovery fraction of the preferred fuel constituents in the purified fuel stream is determined by optimizing the global system efficiency, including the purification system and the fuel cell system, for a given set of hardware. The gains in efficiency of the SOFC from having marginally more fuel directed to the reformer are balanced against the parasitic lost in operating the purification system.

The method also includes the steps of feeding the reformate stream to a SOFC stack that emits an anode tail gas. The anode tail gas may be divided into a first portion and a second portion, in which the first portion is recycled back to the fuel reformer to supplement the purified gas stream and the second portion is recycled back to the combustor to supplement the residual gas stream.

One advantage of the method to operate the SOFC system is that it allows the residual gas stream to be used as supplement fuel to the combustor as opposed to flaring it into the atmosphere with the addition of high quality fuel. Another advantage is it increases fuel to electric efficiency by maintaining the reforming process substantially or fully endothermic. Still, another advantage is less energy is required in the combustor to maintain the desired temperature of the fuel reformer. Yet, another advantage is that the losses in separating and purifying the by-product gas to be used as fuel can be substantially reduced because high yield recovery of preferred fuel constituents is not required.

BRIEF DESCRIPTION OF THE DRAWINGS

The present invention will now be described, by way of example, with reference to the accompanying drawings, in which.

DETAILED DESCRIPTION OF INVENTION

Figure 1:
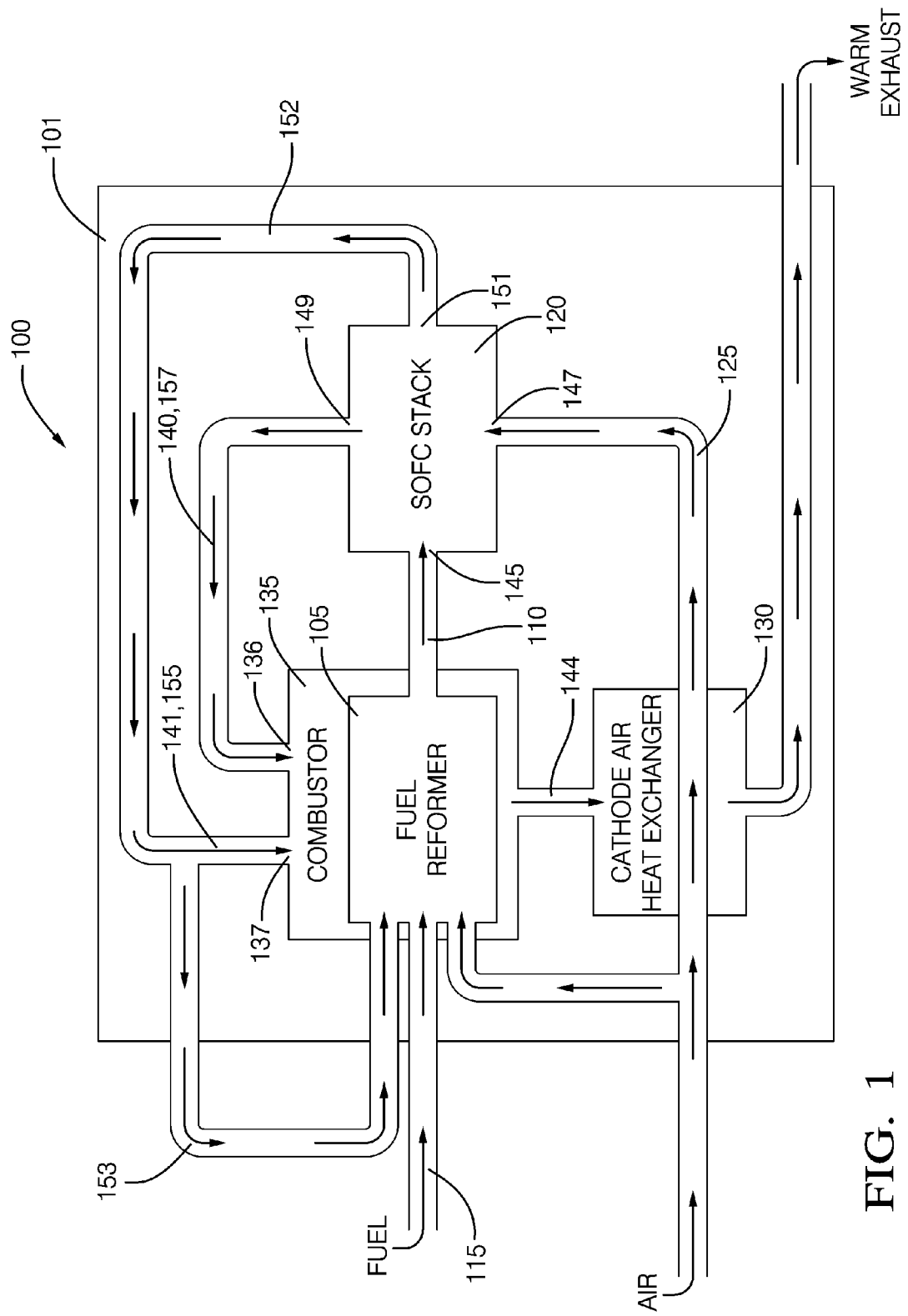
FIG. 1 is a schematic flow diagram of a SOFC system having recycle of a first portion of anode tail gas into the fuel stream ahead of a reformer and a second portion of anode tail gas into a combustor heat exchanger.

In FIGS. 1-4, like numerals indicate corresponding parts throughout the views. Shown in FIG. 1 is a solid oxide fuel cell (SOFC) system 100 for transforming potential chemical energy stored in a hydrocarbon fuel to electrical energy. The SOFC system 100 includes a fuel reformer 105 configured to produce a reformate stream 110 from a hydrocarbon fuel stream 115. The reformate stream 110, together with a cathode air stream 125, is then fed to a SOFC stack 120 in which an electric current is produced. A cathode air heat exchanger 130 is provided to preheat the temperature of the cathode air stream 125 prior to the SOFC stack 120. The SOFC system 100 also includes a combustor 135 for sustaining the temperature of the fuel reformer 105 at a predetermined temperature for higher fuel processing efficiency. The above listed components may be housed within an insulated container 101.

The exemplary fuel reformer 105 shown in FIG. 1 is a catalytic fuel reformer, such as partial oxidation (CPOx) reformer, that is configured to convert a hydrocarbon fuel stream 115 into the reformate stream 110 containing CO and $H_2$. The fuel reformer 105 may include an integrated combustor 135 in thermal communication with the fuel reformer 105. A combustor air stream 140 and a combustor fuel stream 141 are supplied to the combustor 135 via a combustor air inlet 136 and a combustor fuel inlet 137, respectively. A predetermined ratio of combustor air/fuel mixture is burned in the combustor 135 producing heat energy. The heat energy produced by the combustor 135 is transferred to the fuel reformer 105 in order to maintain the temperature of the fuel reformer 105 at an elevated optimal level for efficient reforming of the hydrocarbon fuel stream 115 into the reformate stream 110. The effluent combustion gas 144 exiting the combustor 135 contains waste heat, which is captured downstream in the cathode heat exchanger 130. The waste heat is used to preheat the cathode air stream 125 to the SOFC stack 120 to increase the operating efficiency of the SOFC stack 120 by maintaining the operating temperature at approximately 650 to 850° C.

The SOFC stack 120 shown in FIG. 1 includes a reformate stream inlet 145 to accept the reformate stream 110 from the fuel reformer 105, an air stream inlet 147 to accept the preheated cathode air stream 125 from the cathode heat exchanger 130, a spent air stream outlet 149, and a anode tail gas outlet 151. The SOFC stack 120 is formed of a plurality of repeating cassettes stacked in series to produce a higher voltage output. The stack of repeating cassettes includes a plurality of operating cassettes, in which each of the operating cassettes includes a picture frame assembly surrounding a SOFC. The SOFC is formed from a high density electrolyte layer sandwiched between a cathode layer and an anode layer.

The reformate stream 110 enters the SOFC stack 120 and passes over the surface of the anode layer. The heated cathode air stream 125 from the cathode air heat exchanger 130 passes over the surface of the cathode layer, in which the oxygen ions from the air migrate from the cathode layer through the dense electrolyte to the anode layer in which it reacts with the $H_2$ and CO in the reformate stream, forming $H_2O$ vapor and $CO_2$, and thereby creating an electrical potential between the anode layer and the cathode layer.

To improve SOFC stack power density, system efficiency, and to reduce carbon precipitation and deposition in the SOFC system 100, a portion of the anode tail gas effluent 152 from the SOFC stack 120 is recycled backed to the hydrocarbon fuel stream 115 upstream of the fuel reformer 105. The anode tail gas is rich in $H_2O$ vapor and $CO_2$ as well as unreacted $H_2$ and CO gases. When these gases are fed back to the fuel reformer 105, endothermic steam reforming occurs in the fuel reformer 105. The heat supplied by the combustor 135 maintains the optimal operating temperature of the reformer 105 in the presence of this endothermic reaction. Also, the heat from the anode tail gas effluent 152 aids in sustaining the optimal operating temperature of the reformer 105; the temperature of the anode tail gas effluent 152 is approximately 650 to 850° C. The anode tail gas effluent 152 exiting the SOFC stack 120 may be divided into a first portion 153 and a second portion 155, in which the first portion 153 is recycled back to the fuel inlet of the reformer 105. The second portion 155 may be recycled back to the combustor to supplement or replace the combustor fuel stream 141. The spent cathode air stream effluent 157 exiting the spent air outlet 149 of the SOFC stack 120 may also be recycled back to the combustor to supplement or replace the combustor air stream 140.

Figure 2:
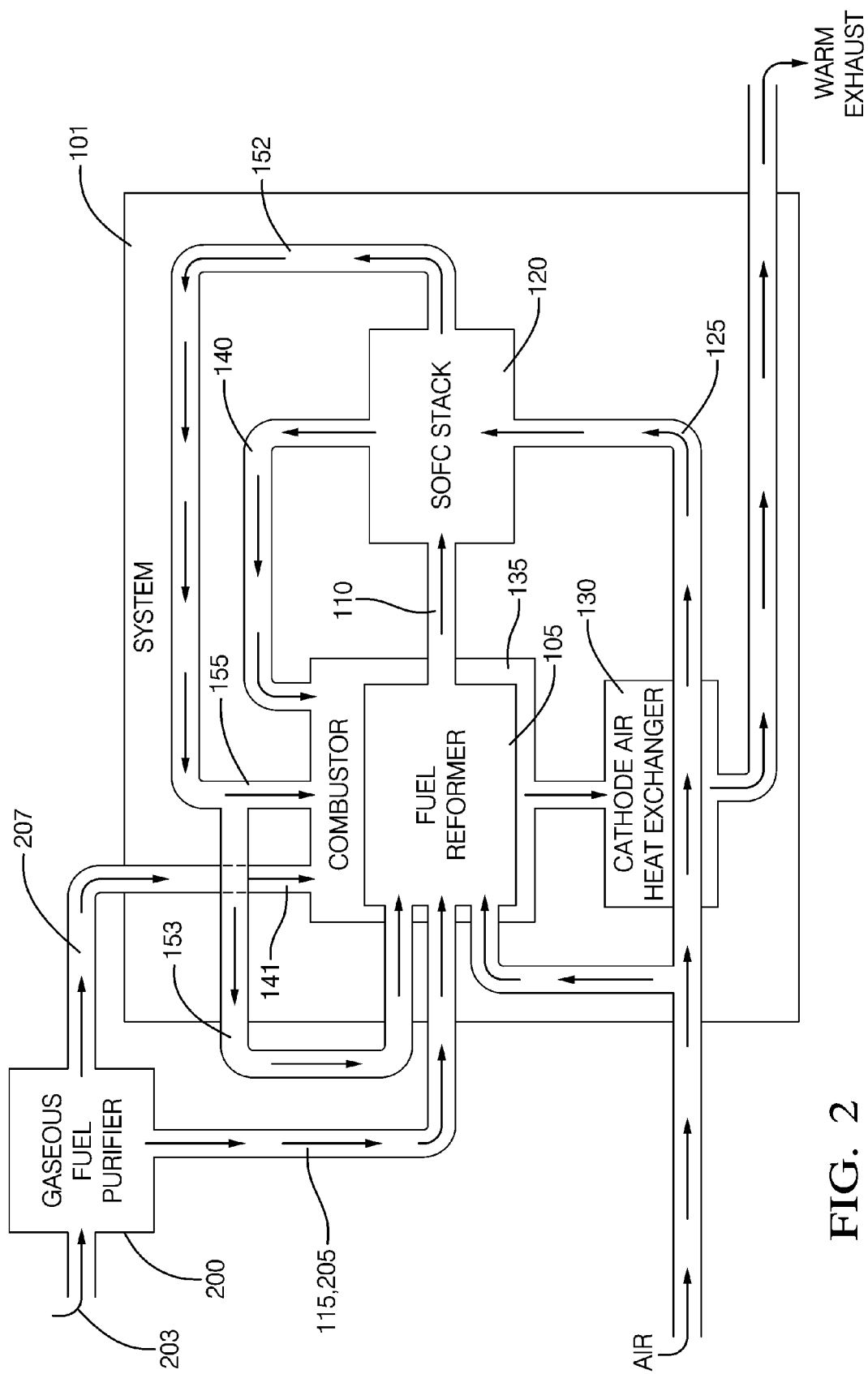
FIG. 2 is a schematic flow diagram of a SOFC system in accordance with the invention, showing a first portion of treated by-product gas into the fuel stream ahead of the reformer and a second portion of treated by-product gas into the combustor for the fuel reformer.
Figure 3:
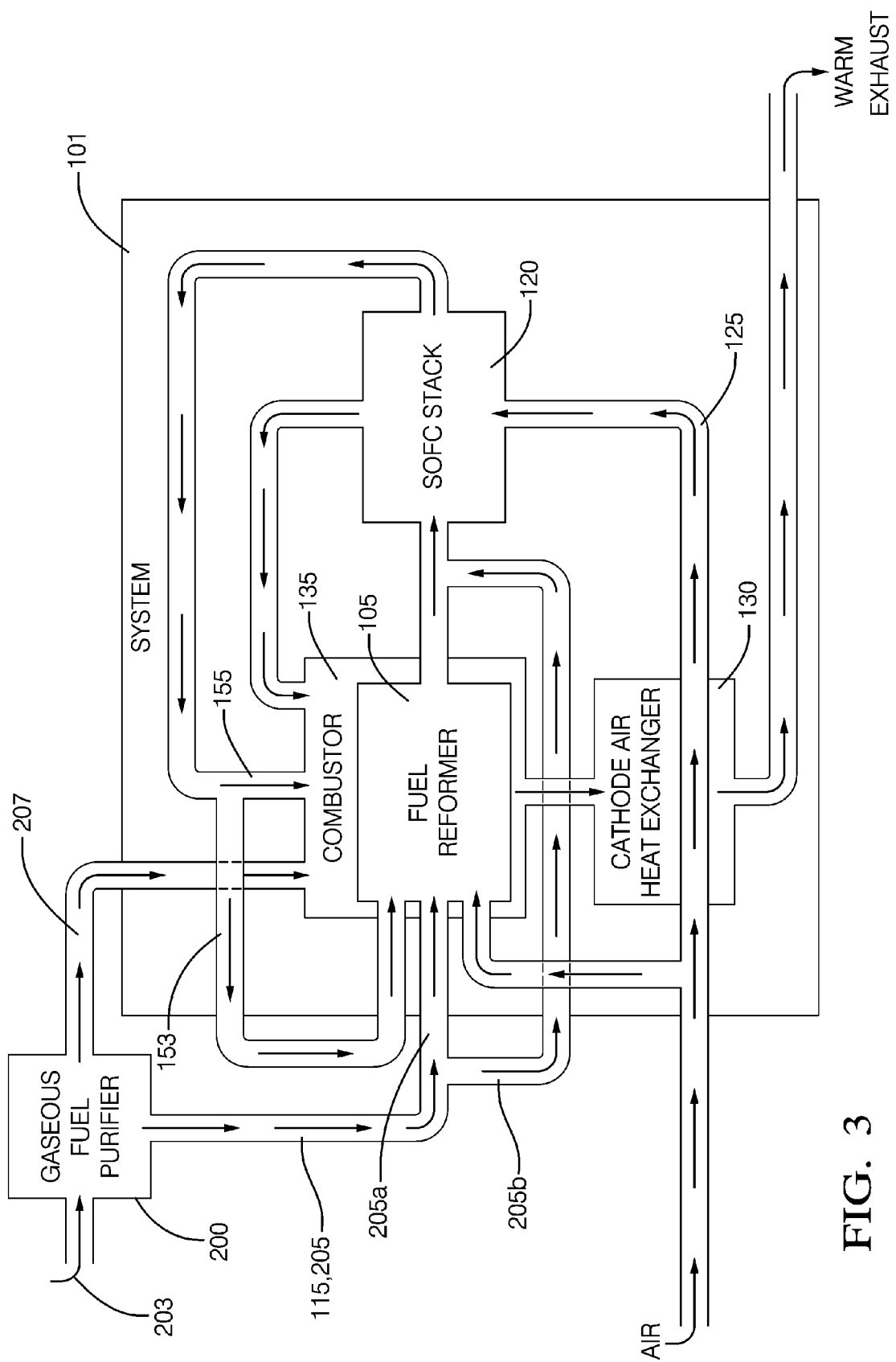
FIG. 3 is a schematic flow diagram of the SOFC system of FIG. 2, showing a third portion of treated by-product gas into the reformate stream ahead of a SOFC stack.
Figure 4:
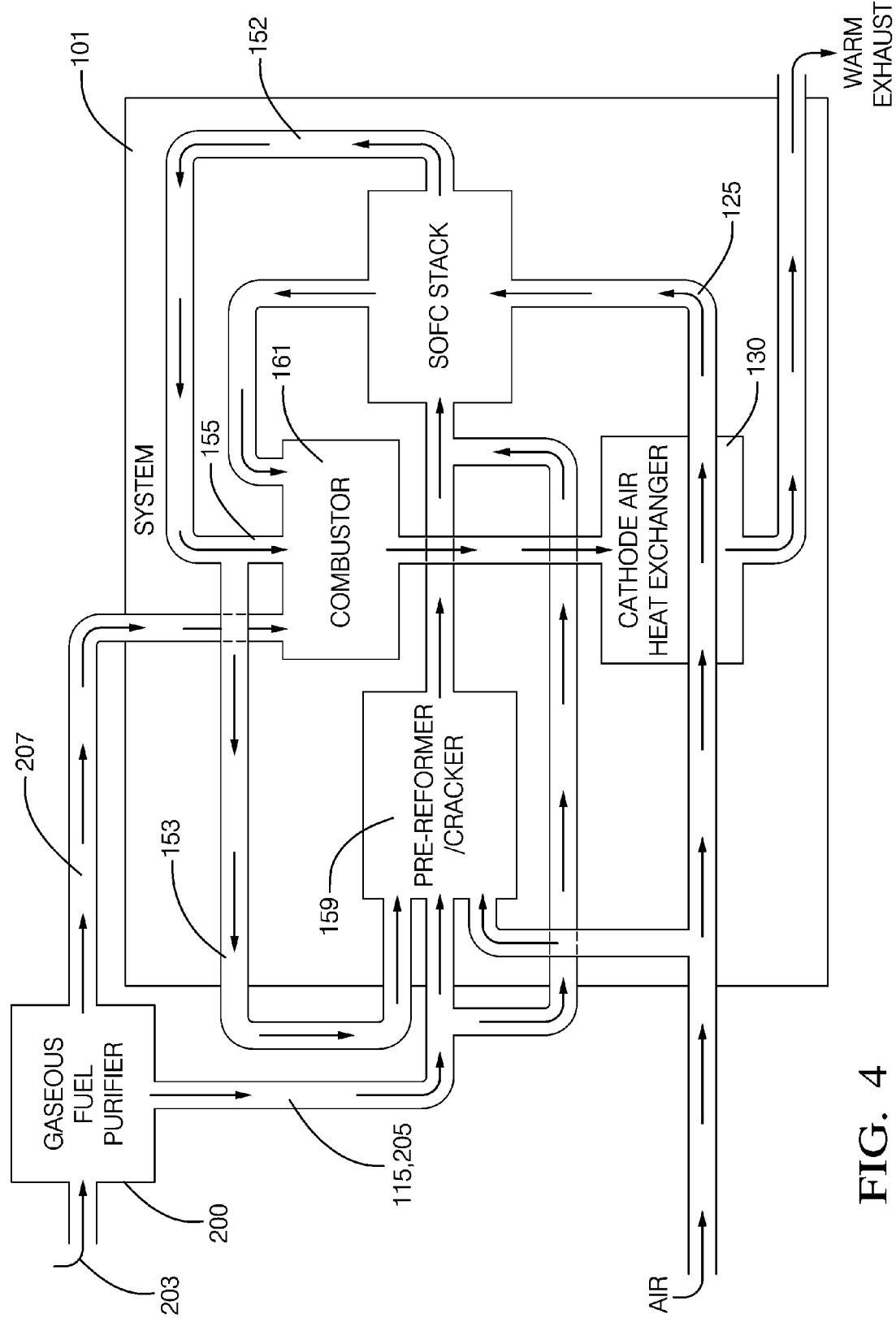
FIG. 4 is a schematic flow diagram of the SOFC system of FIG. 3, showing a separate adiabatic reformer and combustor heat exchanger.

FIGS. 2-4 show that a gaseous fuel purifier 200 may be used to separate and purify a stream of by-product gas 203 containing one or more preferred fuel constituents into a purified gas stream 205 and a residual gas stream 207. Examples of by-product gases 203 includes gas emanating from landfills, waste water treatment operations, and industrial chemical processes, partial oxidation or pyrolysis of organic materials, and gasification of coal or fuel oil. The purified gas stream 205 may be supplied as a fuel stream 115 to the fuel reformer 105. The residual gas stream 207 may be supplied as combustor fuel stream 141 to the combustor 135, together with the second portion 155 of anode tail gas that is not directed to the reformer inlet. For illustrative purposes, the purified and residual fuel streams 205, 207 to the fuel reformer 105 and combustor 135, respectively, are shown as separate entry points to the respective components. In practical application, the purified and residual fuel streams 205, 207 may be introduced directly into the fuel inlets of the reformer 105 and combustor 135, respectively. The purified gas stream 205 to the reformer 105 is a higher grade fuel than that of the residual gas stream 207 to the combustor 135. A higher grade fuel is defined as meaning that the purified gas stream 205 has a higher preferred fuel constituents concentration and contains significantly less contaminants as compared to the residual gas stream 207. The preferred fuel constituents may include light hydrocarbons, such as methane; alcohols, such as methanol and ethanol; or other fuels, such as hydrogen, carbon monoxide, dimethyl ether, or ammonia. The preferred fuel stream may also include inert gases such as nitrogen, carbon dioxide and water vapor. The preferred fuel constituents and acceptable level of inerts may depend on the particular design of the fuel cell system 100 and fuel cell stack 120. Contaminants may include sulfur, phosphorous, siloxanes, halogens, and particulate matter.

As an exemplary embodiment of the invention, the gaseous fuel purifier 200 may configured to process a stream of off-gases from the biodegradation of organic matter within a municipal landfill by removing any contaminates that may be harmful to the SOFC system 100 and to produce a purified gas stream 205 and a residual gas stream 207. The off-gasses may comprise mostly of lighter chain hydrocarbons including methane, together with carbon dioxide, water vapor, and trace amounts of hydrogen sulfides and other inorganics. The gaseous fuel purifier 200 may be that of a typical gas separating system, and depending on the types of contaminates present, may include a hydrogen sulfide adsorption bed, a water condenser, a vapor hydrocarbon absorber, activated carbon, and mechanical means such as filters and cyclones, to remove particulates. The gaseous fuel purifier 200 may also include a pressure swing purifying system known in the art that may include pressure swing absorption, temperature swing absorption, and vacuum swing absorption.

It is preferable that substantially all contaminates such as particulate matter, halogens, sulfur compounds, siloxanes, and any other contaminates that may be detrimental to the fuel cell system 100 be remove from the purified stream 205. Some of the contaminates may be trapped and disposed of in replaceable sorbents (not shown) and others may be present in the residual gas stream 207. However the purified gas stream 205 does need a very high level of recovery of the preferred fuel constituents. In contrast to the method taught by U.S. patent '249 for supplying purified fuel to a fuel cell power plant, the method of operating the SOFC system 100 shown in FIGS. 2 through 4 does not require that the purified gas stream 205 to be essentially pure methane or other desirable fuel constituents. In other words, it is preferable for the gaseous fuel purifier 200 to operate at less than 100 percent recovery, thereby producing a purified gas stream 205 containing desirable fuel constituents along with some other tolerable gases, such as nitrogen, carbon dioxide, and water vapor, originally present in the by-product gas. The unrecovered portion of the preferred fuel constituents may be advantageous retained in the residual gas stream 207.

The operating and capital costs to operate the gas fuel purifier 200 at less than about 90 percent recovery would be significantly less than operating the fuel purifier 200 at essentially 100 percent recovery. The instant method calls for the landfill gas to be purified to provide sufficient desired fuel constituents to be used as a fuel for the fuel reformer 105, while containing sufficiently minimal contaminants to avoid poisoning of the catalysts. The method also calls for the residual gas stream 207, the gas by-product of the purification process of the landfill gas, to contain sufficient desired fuel constituents, inerts and combustible contaminates that, together with the anode tail gas from SOFC stack, may be used as a fuel source for the combustor 135. The residual gas stream 207 may contain sufficiently minimal contaminants. The desired concentration and recovery fraction of the preferred fuel constituents in the purified fuel stream 205 may be determined by optimizing the global system efficiency, including the gaseous fuel purifier 200 and the SOFC system 100, for a given set of hardware within normal engineering constraints.

The residual gas stream 207 is fed to the combustor 135, which when mixed with the $H_2$ contained in the second portion 155 of the anode tail gas effluent 152 produces a combustible mixture of gas which is burned in the combustor 135, thereby supplying useful heat energy to the fuel reformer 105 while eliminating the need to supply commercial grade fuel to flare off the waste gas from the gas purification process. The sulfur content in the purified fuel stream 205 may be controlled by the gaseous fuel purifier 200 to a low concentration of sulfur containing compounds to avoid poisoning the catalyst in the fuel reformer 105 or SOFC in the SOFC stack 120. By feeding the residual gas stream 207 to supplement the combustor fuel stream 141, any contaminants remaining in the residual stream 207 would not affect the catalyst of the fuel reformer or the SOFC anode. This provides the benefit of fewer propensities for deposits and particulate to restrict the flow path through the fuel reformer 105 and the SOFC stack 120; thus allowing the SOFC system 100 to operate reliably on lower quality fuels. While the contaminants and residues, such as ash by-products from any inorganics, may still accumulate to some degree in the gaseous fuel purifier 200 and combustor 135, the gaseous fuel purifier 200 and combustor 135 may be designed for ease of accessibility for routine maintenance to remove these contaminants and residues.

FIG. 3 shows the SOFC system 100 of FIG. 2 having the purified gas stream separated 205 into a first portion purified gas stream 205a and second portion purified gas stream 205b. The first portion purified gas stream 205a is supplied as fuel to the fuel reformer 105. The second portion purified gas stream 205b by-passes the fuel reformer 105 and may be introduced directly into the SOFC stack 120 or the reformate fuel 110 upstream of the SOFC stack 120. This embodiment of the SOFC system 100 is advantageous if the predominant fuel constituents of the purified gas stream 205 are capable of being fully or partially internally reformed in the anode of the SOFC stack 120. Fuels constituents such as methane, methanol, ammonia, and dimethyl ether are known to be attractive for internal reforming, thus allowing a simpler and lower cost pre-reformer to be used and improving the cooling of the SOFC stack 120 by the endothermic fuel reforming reactions and thus reducing the parasitic losses associated with cooling with cathode air.

FIG. 4 shows an alternative embodiment of the SOFC system 100 of FIG. 3 having the fuel reformer 105 and integral combustor 135 substituted with a pre-reformer/cracker 159 and separate combustor 161. This provides a simpler SOFC system 100 for fuels that can be fully internally reformed.

One advantage of the method to operate the SOFC system 100 is that it allows the gaseous fuel purifier 200 to be more efficient, because heating value of the residual gas stream 207 is usefully supplied to the combustor 135 as opposed to flaring off the lower quality residual gas stream 207 with the addition of high quality fuel externally. Another advantage is that this allows for higher recycle fractions and lesser air requirement supplied to the fuel reformer 105, which also increases fuel to electric efficiency by maintaining the reforming process substantially or fully endothermic. Still, another advantage is that the SOFC stack 120 can be run at higher fuel utilization, because less energy is needed in the combustor 135 to maintain the desired temperature as the residual gas stream 205 is providing some useful energy to the combustor 135. Yet, another advantage is that the losses in separating and purifying the off-gases to be used as fuel can be substantially reduced because high yield recovery of preferred fuel constituents is not needed from the fuel purifier 200.

While this invention has been described in terms of the preferred embodiments thereof, it is not intended to be so limited, but rather only to the extent set forth in the claims that follow.

What is claimed is:

1. A method of operating a fuel cell system on a by-product gas, comprising the steps of: separating said by-product gas into a purified gas stream and a residual stream; feeding said purified gas stream to a fuel reformer configured to transform said purified gas stream to produce a reformate stream; feeding said residual gas stream to a combustor configured to burn said residual stream to provide heat energy; feeding said reformate stream to a solid oxide fuel cell stack producing an anode tail gas; wherein said by-product gas is produced by a process selected from a group consisting of bio-degradation of organic matter, pyrolysis of organic material, and gasification of fossil fuel; wherein said step of separating said by-product gas into a purified gas stream and a residual stream is preformed prior to feeding said purified gas stream and said residual stream to said fuel cell system; and wherein said purified gas stream comprises a higher concentration of fuel constituents and a lower concentration of contaminants than said residual gas stream.

2. The method of operating a fuel cell system of claim 1, wherein said by-product gas is a gas emanating from a landfill.

3. The method of operating a fuel cell system of claim 1, wherein said fuel constituents include methane, methanol, ammonia, and dimethyl ether.

4. The method of operating a fuel cell system of claim 1, wherein said contaminants include sulfur compounds, phosphorous compounds, siloxanes, halogens, and particulate matter that may be detrimental to operation of said fuel cell system.

5. The method of operating a fuel cell system of claim 1, further comprising the steps of:
feeding said reformate stream to a solid oxide fuel cell (SOFC) stack producing an anode tail gas,
wherein a portion said anode tail gas is directed to said combustor to supplement said residual gas stream, said combustor is configured to burn said residual gas stream and anode tail gas to provide heat energy.

6. The method of operating a fuel cell system of claim 1,
feeding said reformate stream to a solid oxide fuel cell (SOFC) stack producing an anode tail gas,
wherein said anode tail gas is divided into a first portion and a second portion;
wherein said second portion is directed to said combustor to supplement said residual gas stream, said combustor is configured to burn said residual gas stream and said second portion of anode tail gas to provide heat energy, and
wherein said first portion is recycled back to said fuel reformer to supplement said purified gas stream, said fuel reformer is configured to transform said purified gas stream and said first portion anode tail gas to produce said reformate stream.

7. The method of operating a fuel cell system of claim 6,
wherein said purified gas stream is divided into a second portion,
wherein said second portion of purified gas stream is mixed with said reformate stream downstream of said fuel reformer and upstream of said SOFC stack.

8. The method of operating a fuel cell system of claim 1,
wherein said purified gas stream is divided into a second portion,
wherein said second portion of purified gas stream is mixed with said reformate stream downstream of said fuel reformer and upstream of said SOFC stack.

9. The method of operating a fuel cell system of claim 1, further including the step of determining the desired recovery fraction of said fuel constituents in the purified fuel stream by minimizing the parasitic energy losses in the purification processes while increasing the marginal operating efficiency of said fuel cell system.

10. The method of operating a fuel cell system of claim 1, further including the step of determining the desired recovery fraction of said fuel constituents in the purified fuel stream by balancing the energy losses in the purification processes with the marginal increase in the operating efficiency of said fuel cell system.

11. The method of operating a fuel cell system of claim 1, wherein said purified stream is substantially free of sulfur compounds to avoid poisoning of said fuel cell system.

12. The method of operating a fuel cell system of claim 1, further comprising the step of providing said heat energy to said fuel reformer.

13. The method of operating a fuel cell system of claim 1, further comprising the step of providing said heat energy to a cathode air heat exchanger.

14. The method of operating a fuel cell system of claim 1, wherein the step of separating said by-product gas includes as least one of filtering, condensing, and passing a gas flow through a selective absorption bed.

15. The method of operating a fuel cell system of claim 1, wherein the step of separating said by-product gas also includes at least one of pressure swing absorption, temperature swing absorption, and vacuum swing absorption.

* * * * *